(12) United States Patent
Feliciano, Jr. et al.

(10) Patent No.: US 7,484,594 B1
(45) Date of Patent: Feb. 3, 2009

(54) DEVICE FOR TRANSPORTING LONG OBJECTS SUCH AS A LADDER

(76) Inventors: Angel M. Feliciano, Jr., 13254 Hiawatha Dr., Homer Glen, IL (US) 60491; Thomas G. Bryant, Sr., 23808 W. Caton Farm Rd., Plainfield, IL (US) 60586

( * ) Notice: Subject to any disclaimer, the term of this patent is extended or adjusted under 35 U.S.C. 154(b) by 184 days.

(21) Appl. No.: 11/416,694

(22) Filed: May 3, 2006

(51) Int. Cl.
*E06C 5/00* (2006.01)

(52) U.S. Cl. ............ 182/127; 248/129; 280/47.41

(58) Field of Classification Search ............ 248/129, 248/130, 133, 136, 139; 182/20, 127; 280/47.28, 280/47.31, 47.33, 47.41
See application file for complete search history.

(56) References Cited

U.S. PATENT DOCUMENTS

| | | | | |
|---|---|---|---|---|
| 1,255,484 A | * | 2/1918 | Stephens | 414/457 |
| 1,350,119 A | * | 8/1920 | Staley | 269/15 |
| 2,438,527 A | * | 3/1948 | Werner | 193/35 R |
| 2,903,258 A | * | 9/1959 | Jovanovich | 269/296 |
| 3,362,673 A | * | 1/1968 | Patch | 248/397 |
| 3,404,884 A | * | 10/1968 | Sorenson et al. | 482/34 |
| 3,923,167 A | * | 12/1975 | Blankenbeckler | 414/11 |
| 4,049,283 A | * | 9/1977 | Brookes et al. | 280/47.131 |
| 4,804,162 A | * | 2/1989 | Rice | 248/671 |
| 5,020,757 A | | 6/1991 | Sulecki | |
| 5,727,799 A | | 3/1998 | DiSario | |
| 5,944,896 A | * | 8/1999 | Landesman et al. | 118/500 |
| 6,209,681 B1 | | 4/2001 | DiSario | |
| 6,322,061 B1 | * | 11/2001 | Maser et al. | 269/17 |
| 6,592,134 B2 | | 7/2003 | Abraham | |
| 6,708,993 B2 | | 3/2004 | Feik | |
| 6,896,273 B2 | | 5/2005 | Forsberg | |

* cited by examiner

*Primary Examiner*—A. Joseph Wujciak, III

(57) ABSTRACT

A transporting device has a frame with wheels for rolling over a surface. At the upper end of the frame are a pair of hooks for receiving the rungs of a ladder. The hooks can be replaced with a planar surface for transporting long objects such as pipes or boards.

15 Claims, 16 Drawing Sheets

DEVICE FOR TRANSPORTING LONG OBJECTS SUCH AS A LADDER

The present invention is a device for transporting long objects, the device having wheels and a structure for supporting elongate objects including lumber, pipe and a ladder.

BACKGROUND OF THE INVENTION

Those involved in the service and construction industries are frequently required to deliver ladders and other long objects, such as long boards, pipe and the like to a work site. Service personnel often work alone and as a result, the task of moving long heavy ladders, pipe, and other awkward elongate material must be undertaken by one person. Even when there are several people on the same work site, the task of transporting elongate material may fall to a single individual. Frequently, the elongate material must be removed from a roof or side rack of a vehicle, which is a difficult task in itself.

Not only is the task of moving long heavy objects difficult, injuries occur when one strains to obtain and maintain control of a long heavy object. It would be desirable therefore to provide a device which will simplify the transporting of long heavy objects. It would be further desirable to provide a transporting device which would collapse so as to be readily transportable along with the ladder or other elongate material which is to be moved to and from a work site.

SUMMARY OF THE INVENTION

Briefly, the present invention is embodied in a device for transporting a ladder or other elongate material. The device includes a generally vertically oriented frame having a pair of wheels at the lower end thereof for moving the frame and any objects retained thereon across the ground. At the upper end of the frame is a transporting structure for either retaining elongate material, or for grasping the rungs of a ladder. Where the device is to be used to transport a ladder, the upper end of a frame includes a pair of hooks, with each of the hooks having a pair of parallel sides, a closed end joining one end of each of the parallel sides, and an open end. The hooks are spaced from each other sufficiently far apart such that a first hook will engage a first rung of the ladder and a second hook will engage a second rung of the ladder. The open ends of the hooks are oriented at approximately ninety degrees with respect to one another such that after the first hook has engaged the first rung, the engagement of the second hook around the second rung of the ladder will prevent the first rung from becoming dislodged from the first hook.

The first and second hooks are mounted on an arm that is pivotally attached to the upper end of the vertical frame such that the arm is moveable from a first position in which it is generally perpendicular to the vertical frame, and a second position in which it is parallel to the frame. The device further includes a lock for locking the arm in the first position so as to be rigidly retained while the ladder is being moved. The device can therefore be collapsed to occupy a minimum amount of space while the ladder and transportation device are being transported, but can be easily assembled when needed.

When the device is used to transport long objects, such as two by fours, pipe, PVC, and the like, the upper end has at least one member attached thereto the upper surface of which defines a plane that is generally perpendicular to the vertically extending frame. In the preferred embodiment, the plane defined at the upper end has a length and a width sufficiently large to provide support to the objects to be transported. The planar upper surface also has a pair of spaced apart side members that define sides for the transporting surface between which elongate members can be retained. Positioned on the planar upper surface is an abrasive coating, or a rubberized panel that will minimize longitudinal sliding of elongate objects that are retained between the parallel side members.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENTS

Figure 1:
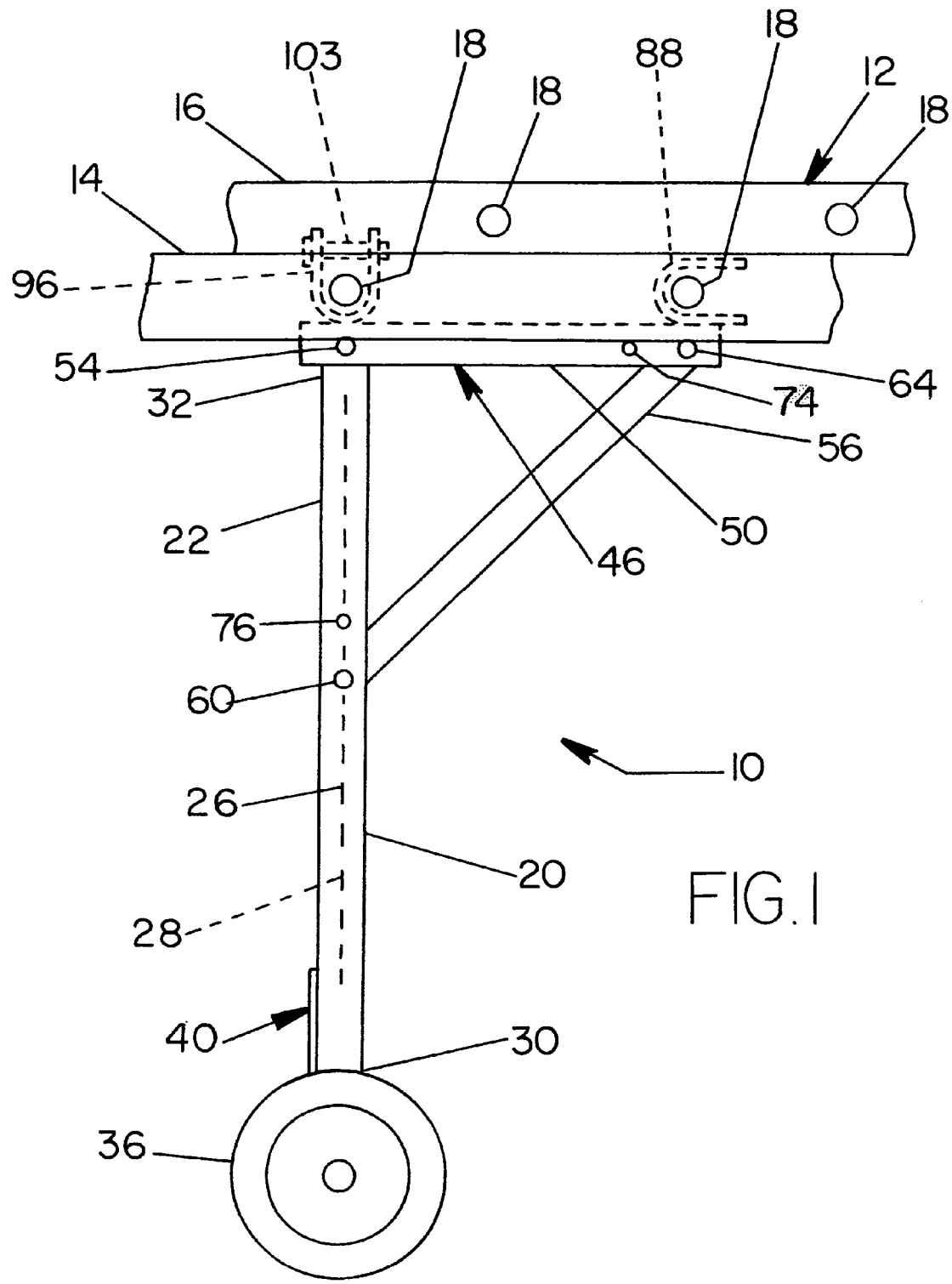
FIG. 1 is a side elevational view of a transporting device in accordance with the invention being used to transport a fragment of a ladder with the hidden portions of the device shown in broken lines.
Figure 2:
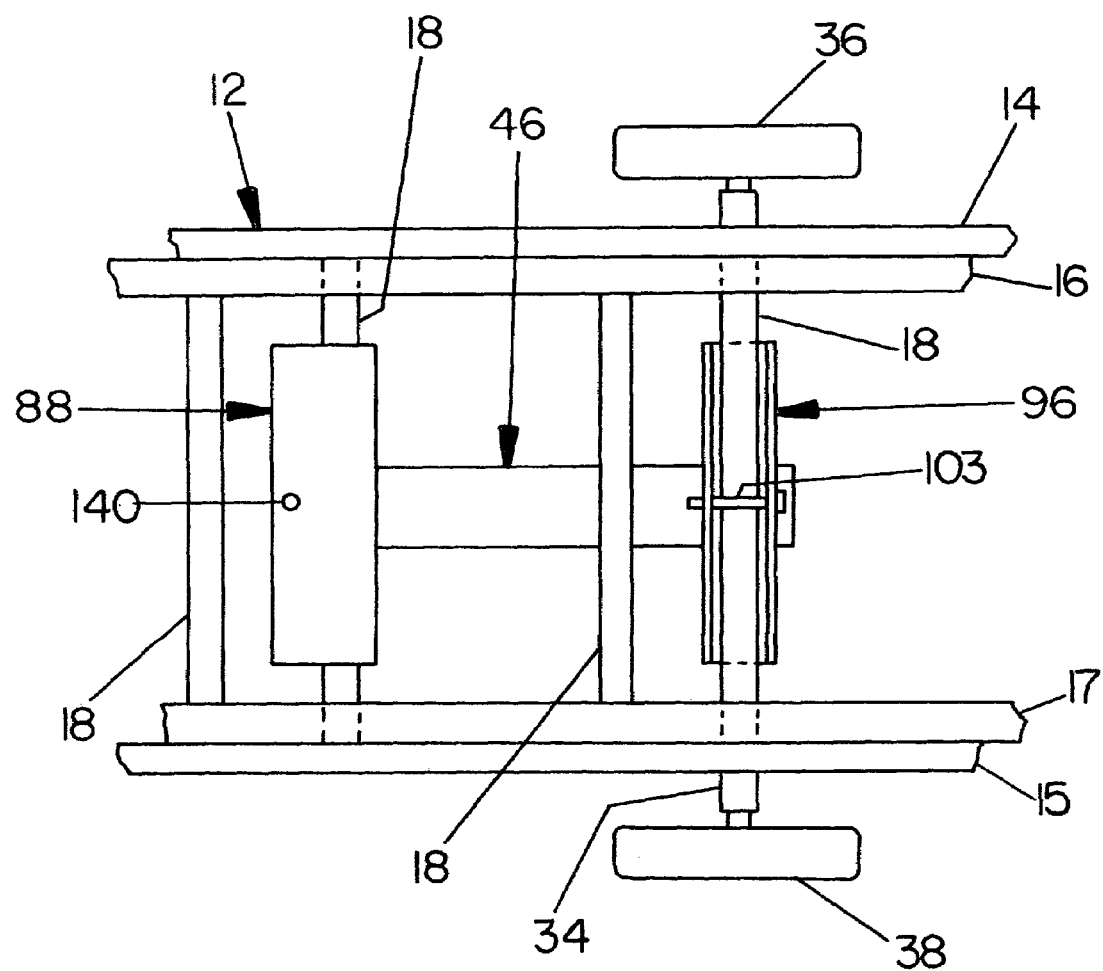
FIG. 2 is a top view of the device and the fragment of the ladder shown in FIG. 1.
Figure 3:
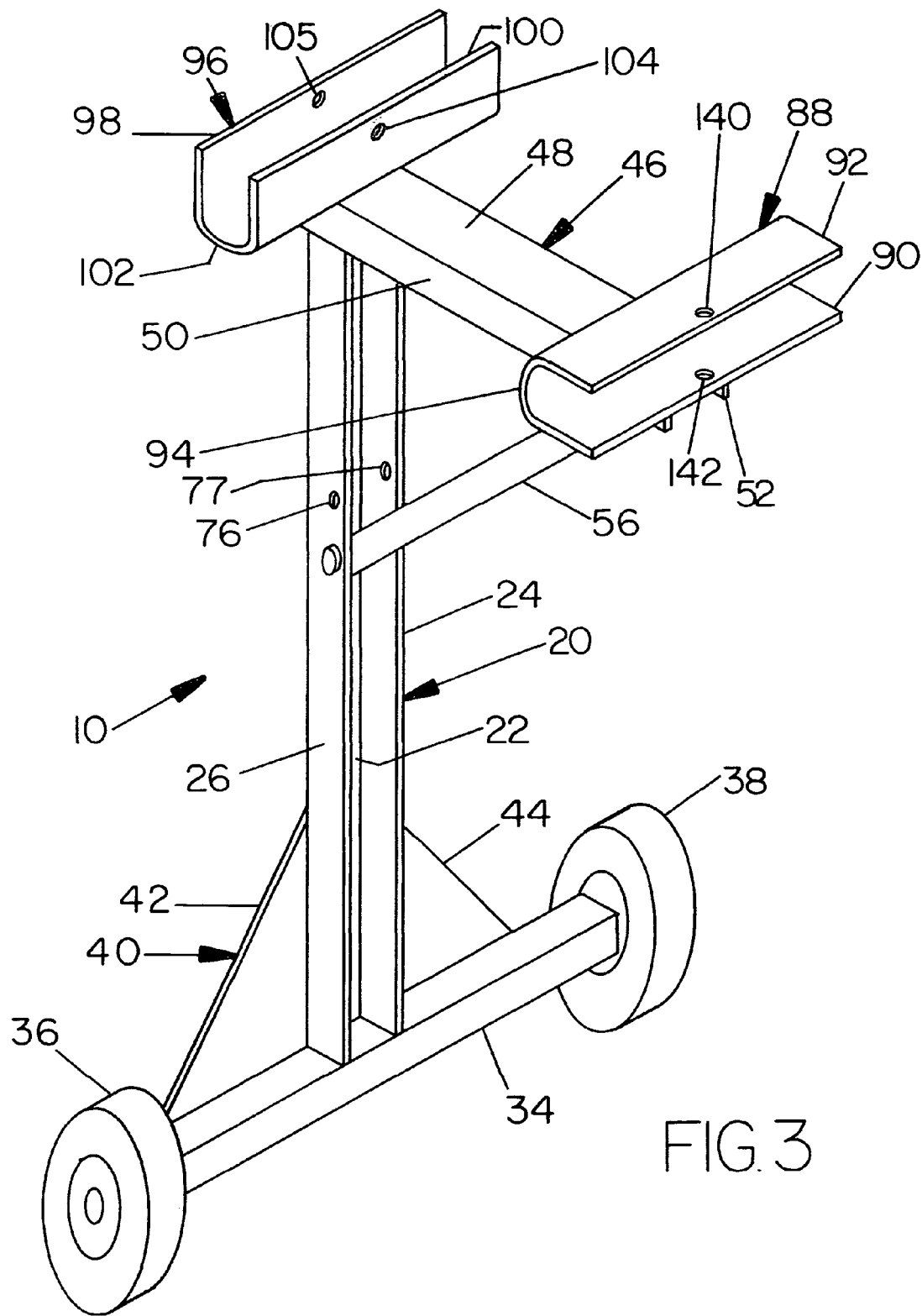
FIG. 3 is an isometric view of the device shown in FIG. 1, with the ladder removed.

Referring to FIGS. 1, 2, and 3, a transporting device 10 is used to carry an elongate extension ladder 12 having first and second longitudinally adjustable portions, and each of the adjustable portions having spaced apart generally parallel side members 14, 15 and 16, 17 respectively. Extending between the side members 14, 15 and 16, 17 are a plurality of equally spaced parallel rungs 18-18. The spacings between the rungs 18-18 is usually about one foot, although the spacings may differ by less than an inch from one manufacture of ladders to another, but the spacings are never less than one foot. The side members 14, 15 and 16, 17 are usually parallel to each other or nearly so. For most ladders, the surfaces of the side members 14, 17 that are directed toward each other are spaced apart a distance of at least one foot.

To transport the ladder 12, the device 10 includes a metal frame 20 that in the preferred embodiment is formed as a channel having a back member 22 and parallel side members 24, 26 and with the centerline of the back 22 of the channel defining a longitudinal axis 28. When in use, the frame 20 is generally vertically oriented such that it has a lower end 30 and an upper end 32. A cross bar 34 at the lower end of the frame 20 extends generally perpendicular to the longitudinal axis 28 and has at the ends thereof a pair of co-axially mounted rotatable wheels 36, 38. A triangularly shaped gusset 40 has one edge, not visible, that extends along the cross bar 34 and sloping sides 42, 44 extending between the cross bar 34 and the frame 20. The gusset 40 is secured by welds or the like to the back 22 of the frame 20 and to the cross bar 34 to retain the cross bar 34 in its desired orientation even when the parts are subjected to heavy loads.

Figure 4:
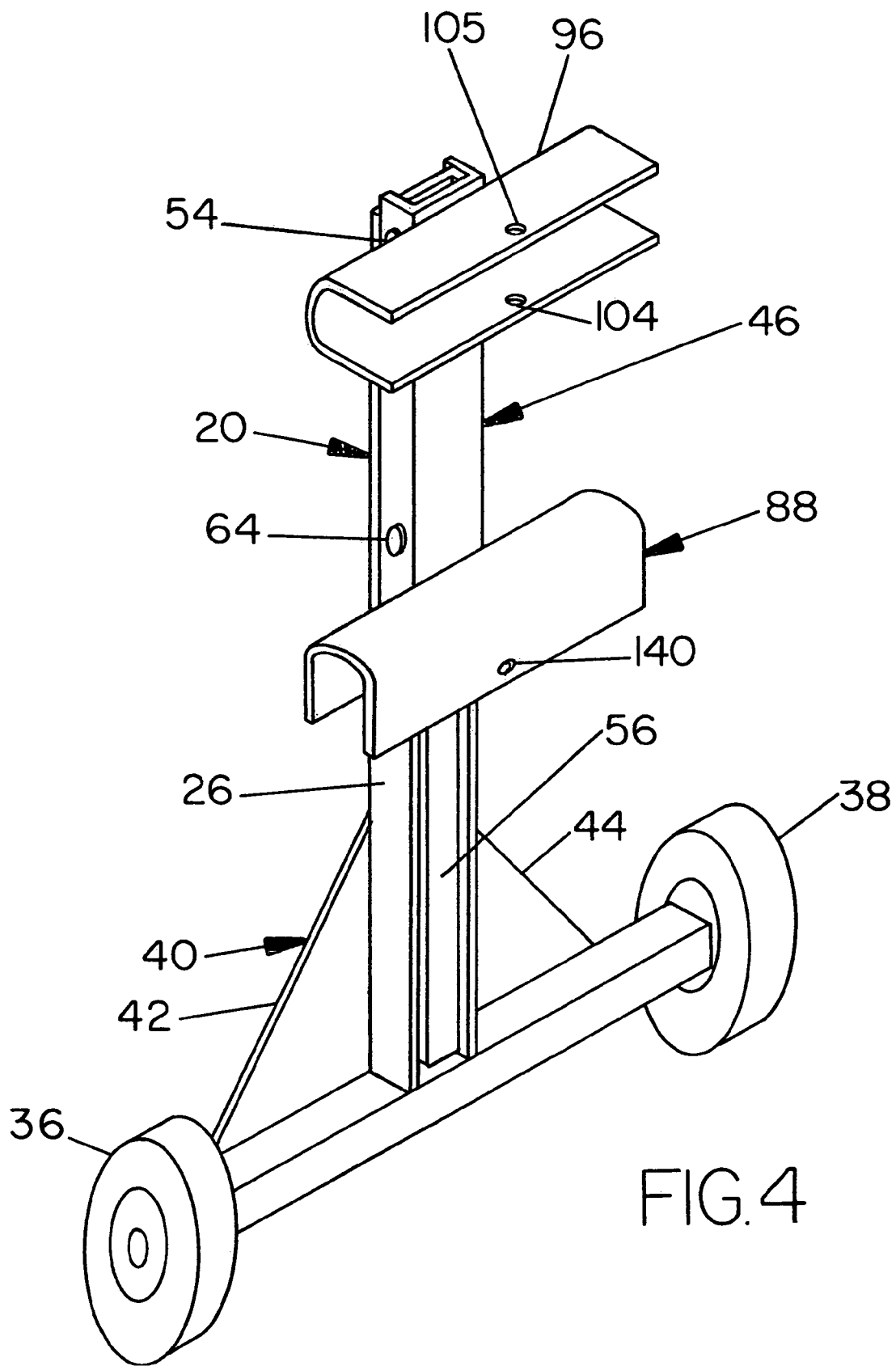
FIG. 4 is another isometric view of the device shown in FIG. 3 with the arm thereof in the collapsed position.
Figure 5:
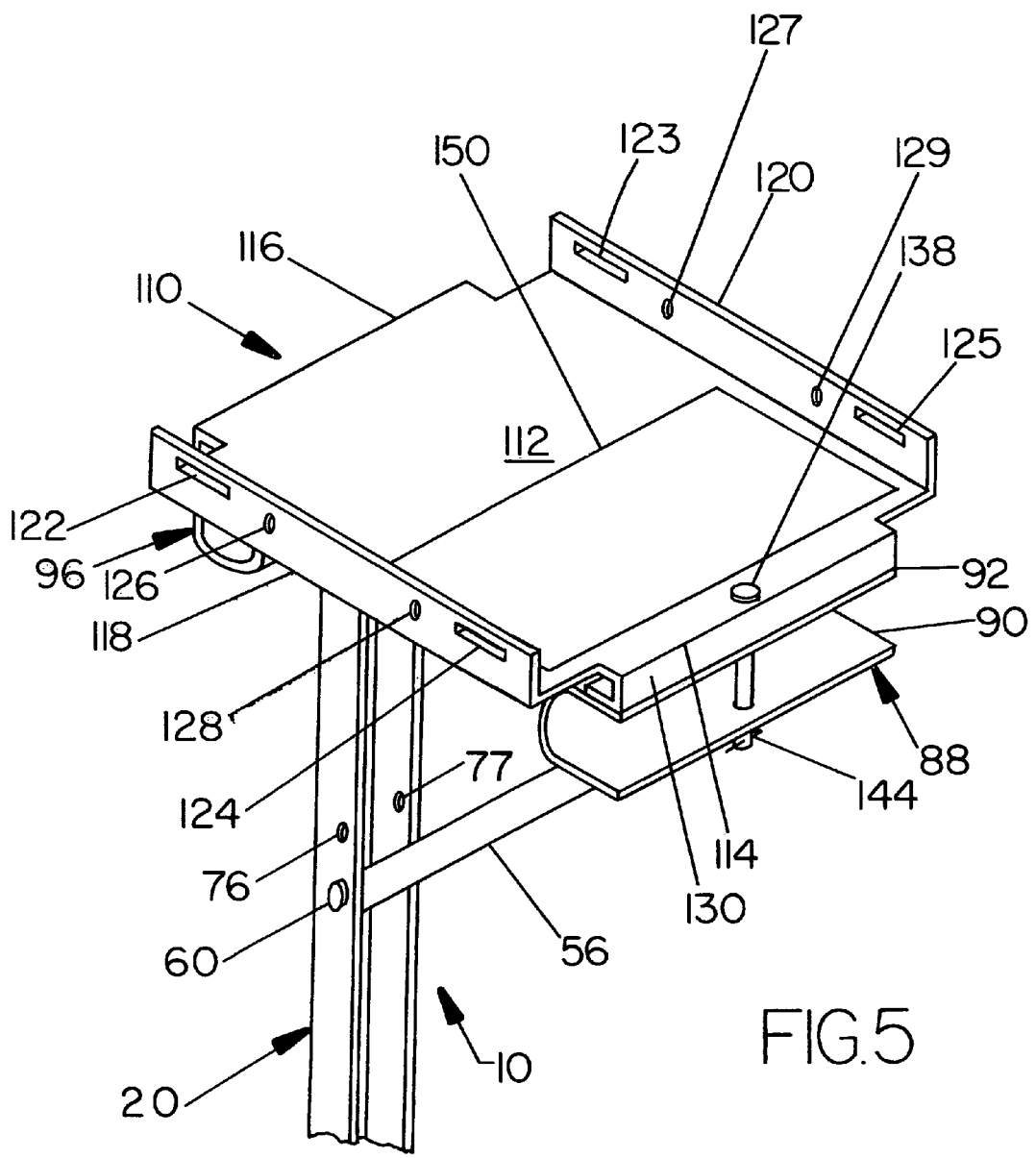
FIG. 5 is a fragmentary isometric view the device shown in FIG. 1 with an attachment for carrying long objects other than a ladder.
Figure 6:
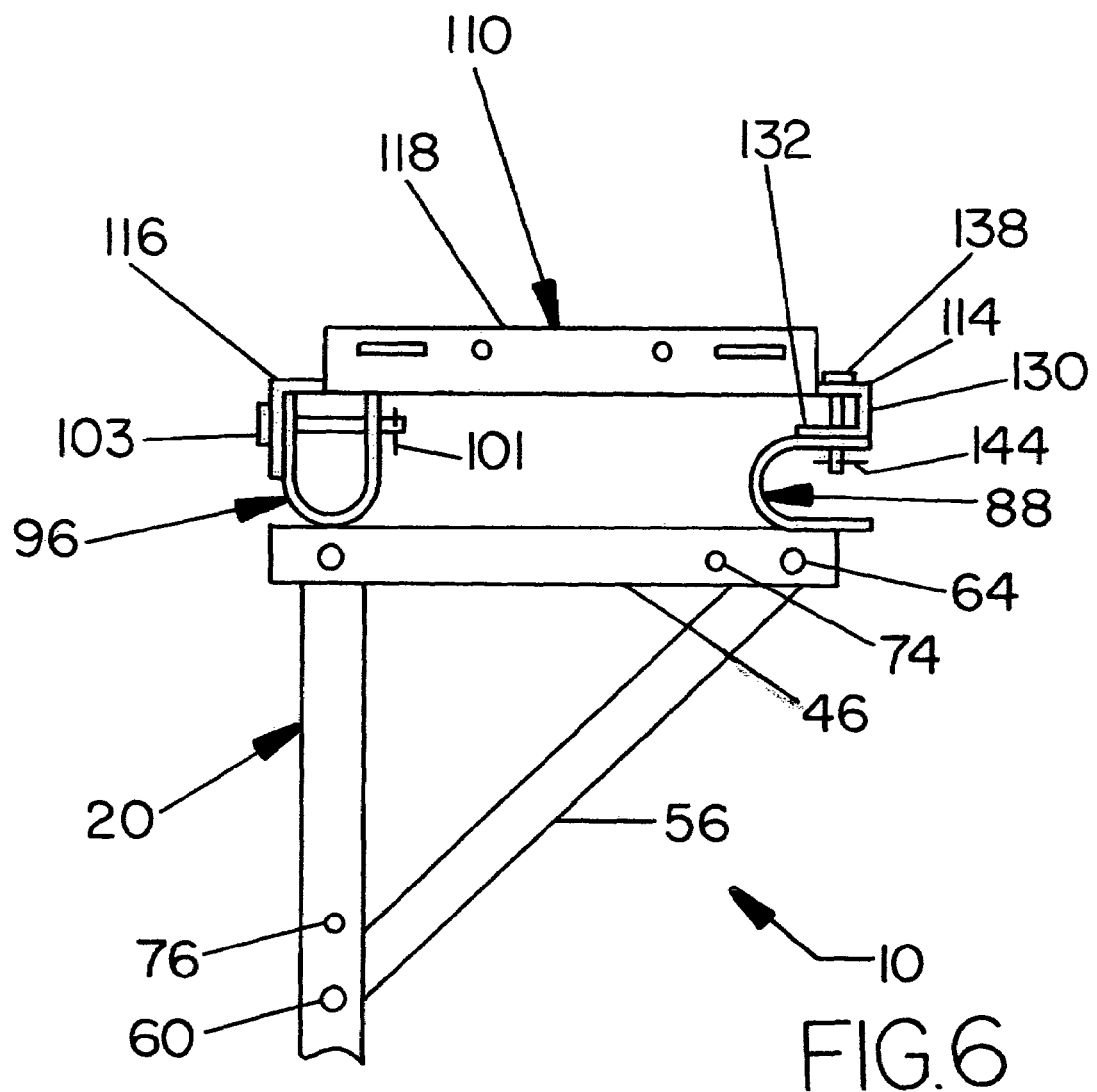
FIG. 6 is a fragmentary side view of the device and attachment shown in FIG. 5.

At the upper end 32 of the frame 20 is an elongate arm 46 in the form of a channel having a back 48 and parallel side members 50, 52. The inner surfaces of the side flanges 50, 52 are spaced a distance apart that is a little greater than the outer surfaces of the side members 24, 26 of the frame 20. Accordingly, the side flanges 50, 52 of the channel 46 are positioned around the side members 24, 26 of the frame 20 and the parts are retained together by a pin 54 extending through the side flanges 50, 52 of channel 46 and the side members 24, 26 of frame 20. The holes through the various parts are positioned to enable the arm 46 to be rotatable around the shank of the pin 54 from a first position where it is perpendicular to the longitudinal axis 28 of the frame 20, as shown in FIGS. 1 and 3, to a second position where the arm 46 is parallel to the frame 20 as shown in FIG. 4.

The device further includes a support arm 56, which can be either a length of channel or a box, with the outer surfaces of the side flanges of the channel or sides of the box having a width that is less than the distance between the inner surfaces of the side members 24, 26 of the frame 20 such that the support arm 56 can be retained between the side members 24, 26. A second pin 60 extends through holes in the side members 24, 26 and in the side flanges of the channel or walls of the box of the support arms 56 to pivotally retain the lower end of the support arm 56 between the side members 24, 26 of the frame 20. The upper end of the support arm 56 is retained by a third pin 64 and extends through aligned holes in the upper end of the support arm 56 and another pair of aligned holes in the outer ends of the side flanges 50, 52 of the arm channel 46.

The first and second pins 54, 60 are not intended for removal and may be retained in place by any suitable means such as lock washers, welds, or the like, so long as they provide for rotation of one part with respect to the other around the shanks of the pins 54, 60. The third pin 64, however, is intended to retain the outer end of the arm 46 in a first orientation where it is generally perpendicular to the axis 28 of frame 20 while the device 10 is in use. The third pin 64 is removable for allowing the arm 46 to collapse and fold to a second position depicted in FIG. 4 where it is aligned parallel to the axis 28 of the frame 20 so that the device will occupy a minimum space during storage. The pin 64 may be a bolt having an elongate shank and threads on the shank for receiving a nut, not shown, loosely threaded thereon to retain the parts in their assembled orientation while the device is in use. The nut is unthreaded and the bolt moved when the arm 46 is to be folded against the frame 20 for storage.

In addition to the holes for receiving pins 54 and 64, the flanges 50, 52 of the arm 46 have another pair of aligned holes, one of which 74 is visible in FIG. 1, also intended to receive the shank of the pin 64. The side members 24, 26 of the frame 20 also have a second pair of aligned holes, 76, 77 that are positioned to align with the holes 74 in the arm 46 when the arm 46 is longitudinally aligned with the frame 20, as shown in FIG. 4. With the arm 46 in this orientation the pin 64 can be inserted in the holes 74, 76, 77 and held in place by the nut as such that the arm 46 is retained in the collapsed position against the frame 20 for storage or for transporting the device to a work site.

Referring to FIG. 3, extending perpendicularly across the back 48 of the outer end of the arm 46 is a U-shaped channel or hook 88 having parallel side members 90, 92 and an arcuate end member 94 joining the side members 90, 92. In cross-section, the channel hook 88 forms a U-shaped configuration in which the side members 90, 92 are spaced apart a distance that is greater than the diameter of a rung 18 of a ladder 12. One side member 90 of the channel hook 88 is welded against the back 48 of the arm 46 with the length of the channel hook 88 being generally perpendicular to the length of the arm 46 and the surfaces of the side members 90, 92 being parallel to the plane of the back 48 such that the open end of the U-shaped hook 88 extends outwardly of the frame 20. A second U-shaped channel 96 also having parallel side members 98, 100 and an arcuate end portion 102 is provided at the inner end of the arm 46. The arcuate end portion 102 of the second U-shaped channel is rigidly welded with the parallel side members 98, 100 extended perpendicular to the back 48 of the arm 46 and perpendicular to the length of the arm 46. The first and second channel hooks 88, 96 are oriented parallel to each other and are spaced a distance between each other such that the first and second channel hooks 88, 96 can both receive rungs 18-18 of the ladder 12.

Referring further to FIGS. 1, 2, 3, and 16, to retain a ladder 12 to the device 10, the open end of the first hook 88 is fitted around one rung 18 of the ladder 12 with the rung against the arcuate inner end 94. With the first rung 18 fitted into the first hook 88, a second rung 18 of the ladder 12 can be fitted between the side members 98, 100 of the second hook 96. With the second rung 18 fitted in the second channel hook 96, the first rung 18 cannot be removed from the first channel hook 88. To retain the second rung 18 within the first channel hook 88, a pin 103 can be inserted through a pair of aligned holes 104, 105 near the outer edges of the side members 98, 100 of the second channel hook 96. With the hooks 88, 96 latched onto the rungs 18-18 of the ladder, the ladder can be rolled across the ground 106 on the wheels 36, 38 to the location where it is needed.

Figure 16:
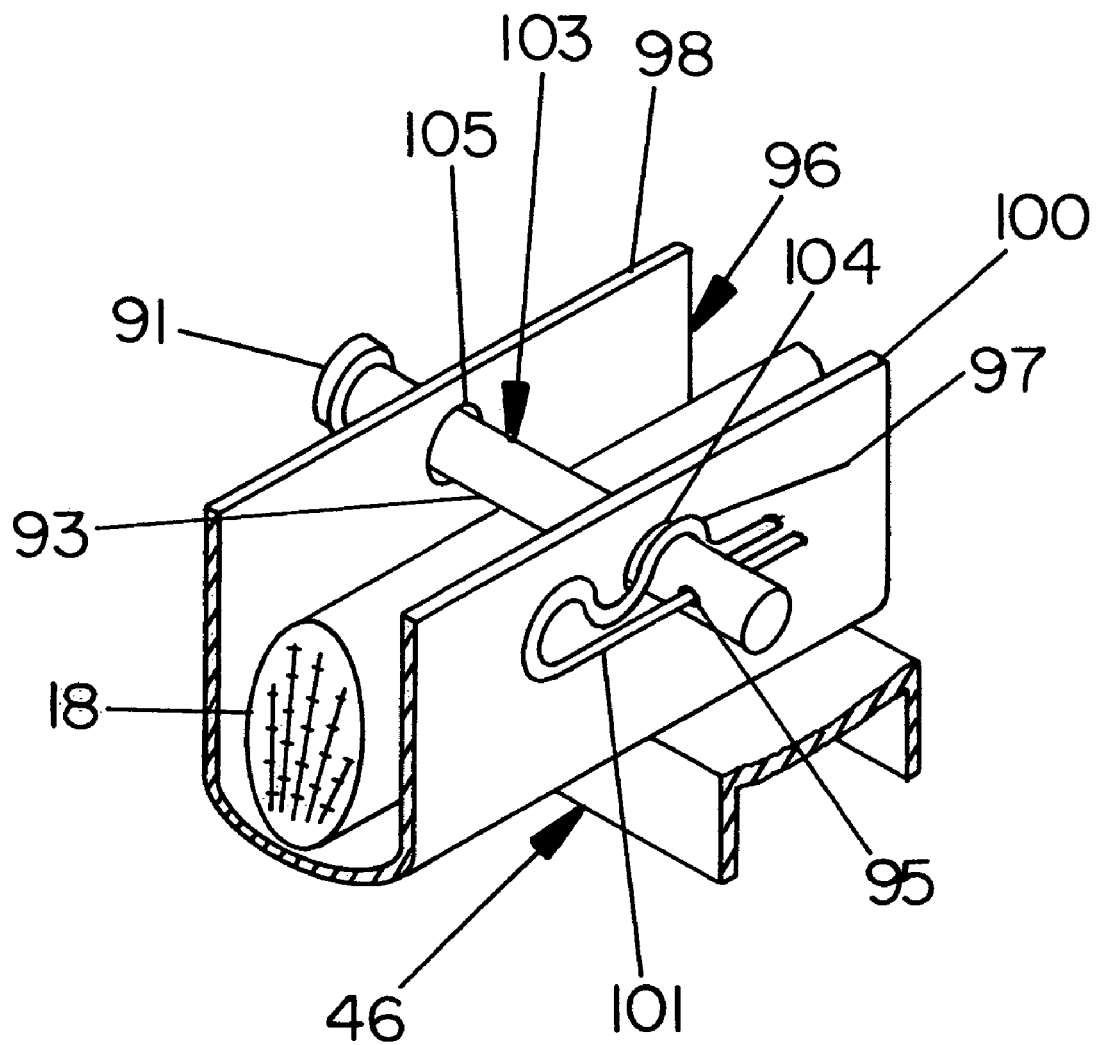

Referring to FIG. 16, the pin 103 may be a hitch pin of the type known in the art having a head 91 at one end of an elongate shank 93. Extending transversely through the opposite end of the shank 93 is a transverse hole 95 sized to receive one of two parallel prongs of a U-shaped retaining clip 101 made of a suitable spring steel. The second prong of the U-shaped retaining clip 101 has an arcuate portion 97 that extends around the outer surface of the shank to retain the first prong of the clip 101 in the hole 95, and thereby retain the shank of the pin 103 from inadvertently becoming removed from the holes 104, 105 in the channel hook 96. The clip 101 and pin 103 are easily removed whenever the operator desires to remove the ladder 12 from the device 10.

Figure 9:
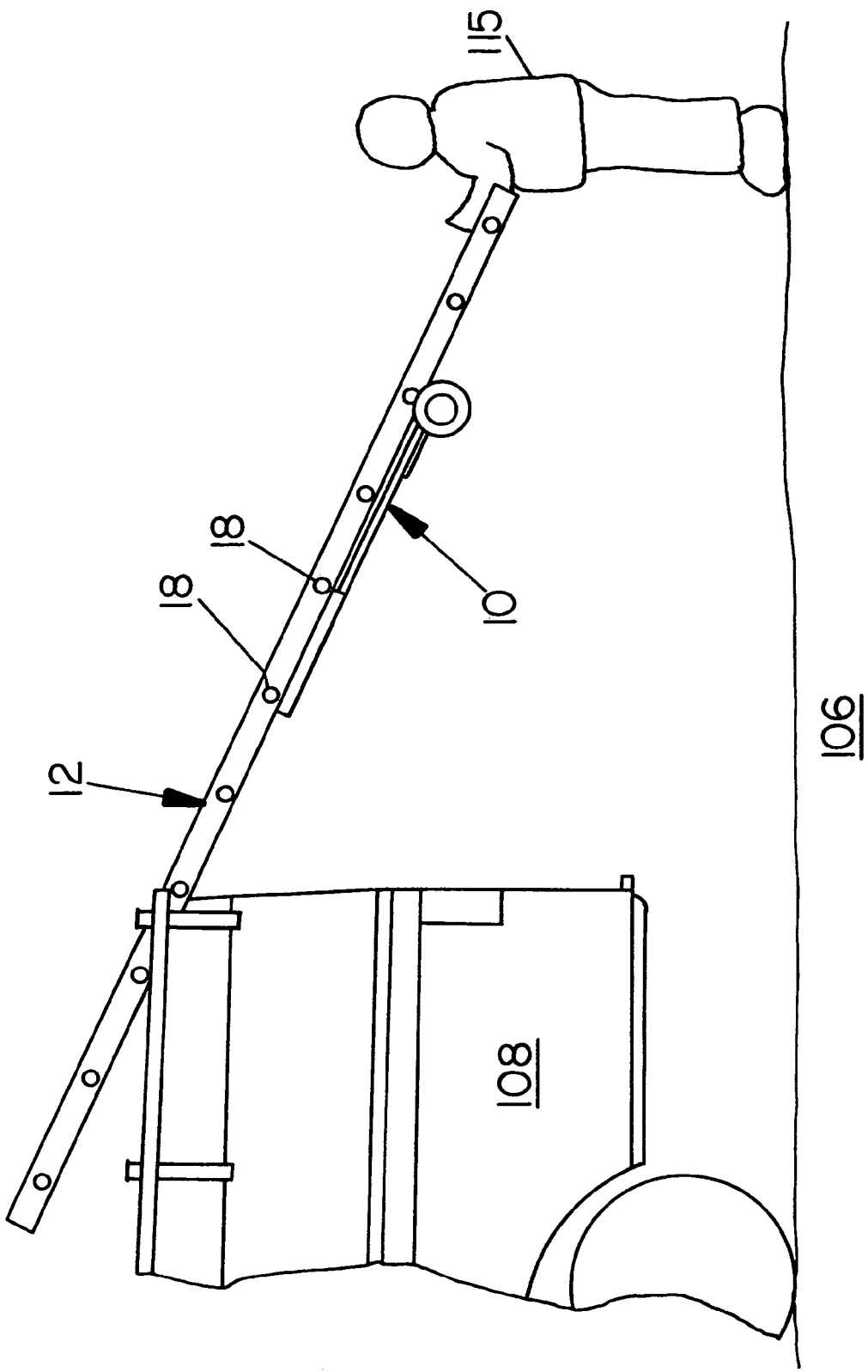
FIG. 9 is a side view of an operator removing a ladder with the device shown in FIG. 1 attached thereto, the device in the collapsed position and the ladder being removed from the roof of a vehicle.
Figure 10:
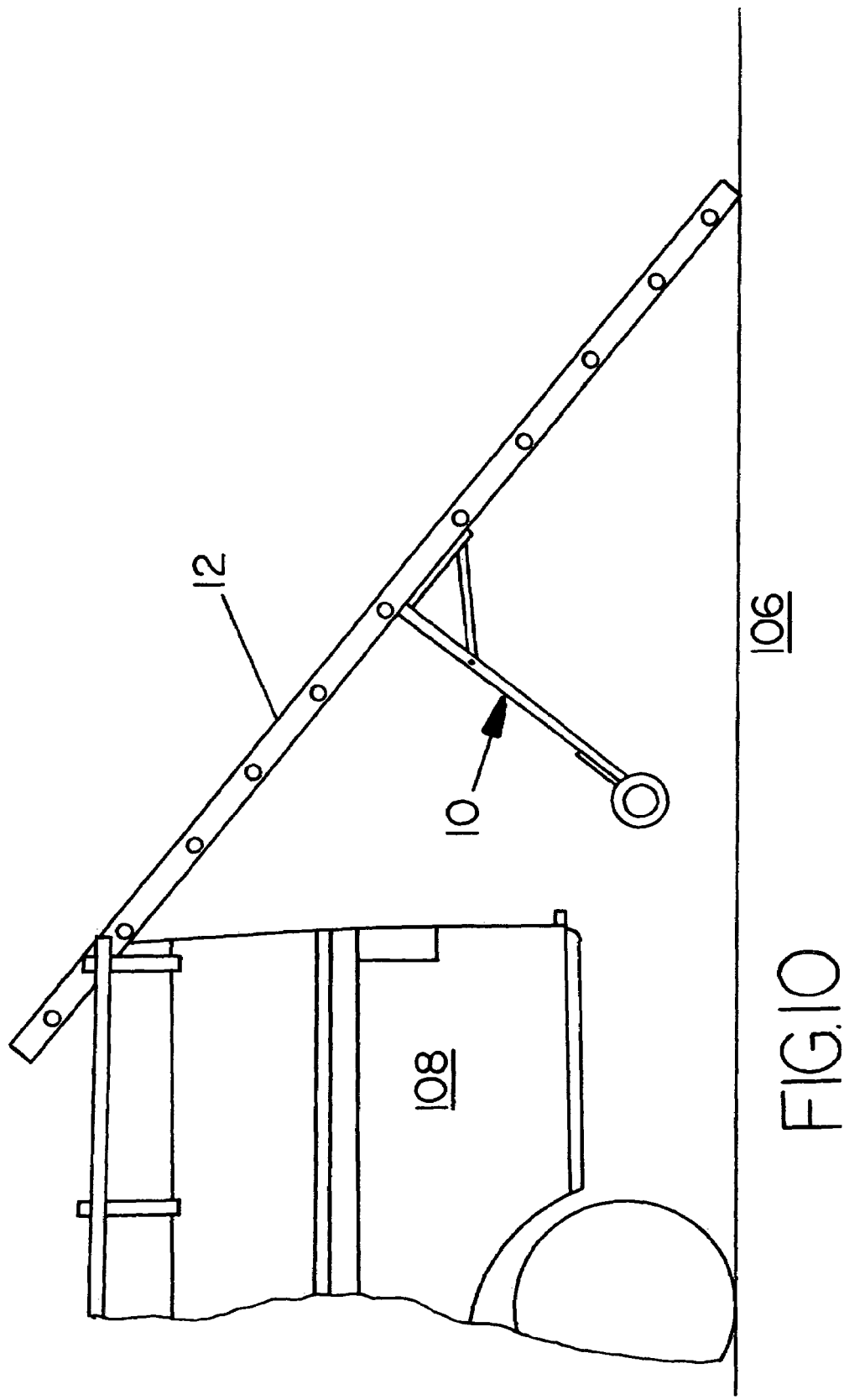
FIG. 10 shows the device and ladder after the device is repositioned for use.
Figure 11:
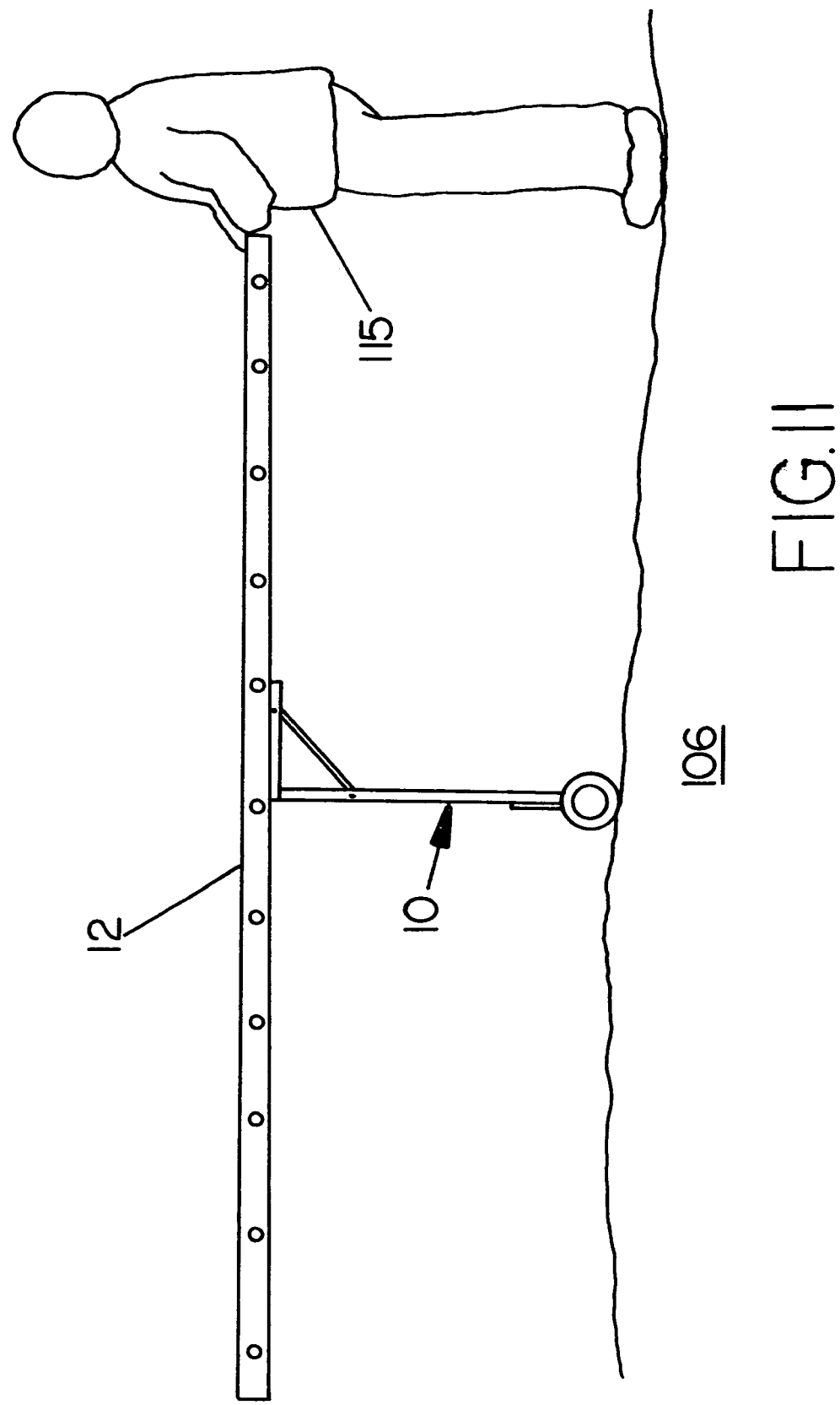
FIG. 11 shows the device being used by an operator to transport the ladder.
Figure 12:
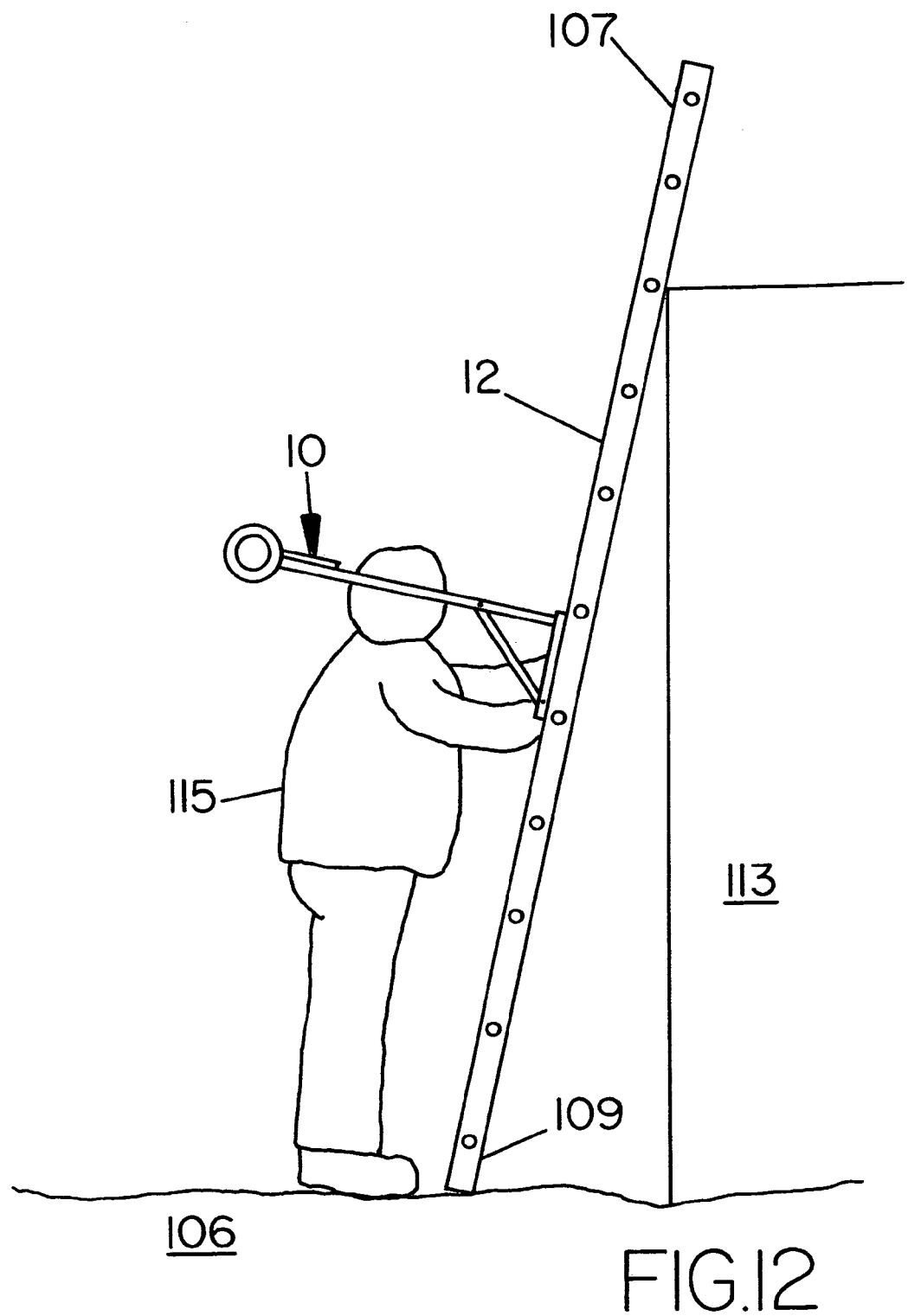
FIG. 12 shows the device and ladder as the operator positions the ladder for use.

Referring to FIGS. 9 through 12, it is most desirable to position the device 10 so as to latch onto two of the center rungs 18 of a ladder 12 so that the weight of the ladder 12 is generally balanced over the wheels 36, 38 as the operator rolls the ladder across the ground 106 to or from a work site 113. As shown in FIG. 9, where the ladder 12 is to be transported on a vehicle 108, the device 10 can be left with the channel hooks 88, 96 locked onto two of the center rungs 18 of the ladder 12 and the device 10 retained in the collapsed position by the third pin 64. As shown in FIG. 10, the pin 64 is repositioned to lock the device 10 in the open position as the ladder 12 is being removed from the vehicle 108. The operator 115 can then maneuver the ladder 12 to a desired site by holding one end of the ladder 12. Once the ladder reaches the work site, the operator can move the upper end 107 of the ladder 12 over his head and use his hands to walk down the rungs 18-18 of the ladder, thereby raising the upper end 107. As the upper end 107 is raised, the lower end 109 touches the ground. As shown in FIG. 12, as the operator continues to walk his hands down the rungs 18-18 of the ladder 12, the upper end 107 of the ladder will reach a generally vertical position. The device 10 can then be removed from the ladder by removing the pin 103 and sliding the second channel hook 96 off the trapped rung 18 of the ladder, thereby leaving the ladder in position for use.

Referring to FIGS. 5 through 8, a tray 110 may be attached to the device 10 to adapt the device 10 to transport long objects 111 such as lumber, PVC, and pipe. The tray 110 is preferably made of stamped sheet metal and has a planar, generally rectangular central body 112 having a forward end 114, a rearward end 116 and parallel sides extending between forward and rearward ends 114, 116. The parallel sides are defined by folded ends 118, 120 sized to retain long objects between them. Elongate slots 122, 123, 124, 125 in the ends 118, 120 are suitable for receiving retaining straps and holes 126, 127, 128, 129 are suitable for receiving cords to retain long objects on the surface 112 and between the edges 118, 120.

The forward end 114 of the tray 110 has a downwardly extending lip 130, the distal end 132 of which extends under a portion of the central body 112. A hole 134 in the central body 112 near the forward end 114 is aligned with a second hole, not visible, in the distal end 132 of the lip for receiving a retaining pin 138. The distal end of the pin 138 is then extends through the pair of aligned holes 140, 142 in the outer edges of the parallel side 90, 92 of the first channel hook 88 to retain the forward end of the tray 110 to the device 10. The pin 138 maybe a hitch pin with a retaining clip 144 of the type described with respect to pin 103 and its associated clip 101.

The rearward end 116 of the tray 110 also has a downwardly extending lip 146 having a hole 148 (only visible in FIG. 7) therein that aligns with the holes 104, 105 in the side members 98, 100 of the second channel hook 96 into which the pin 103 can be fitted. With the hole 148 aligned with holes 104 and 105, 148, the pin 103 can be inserted through all three holes thereby retaining the rearward end of the tray to the device 10.

Figure 7:
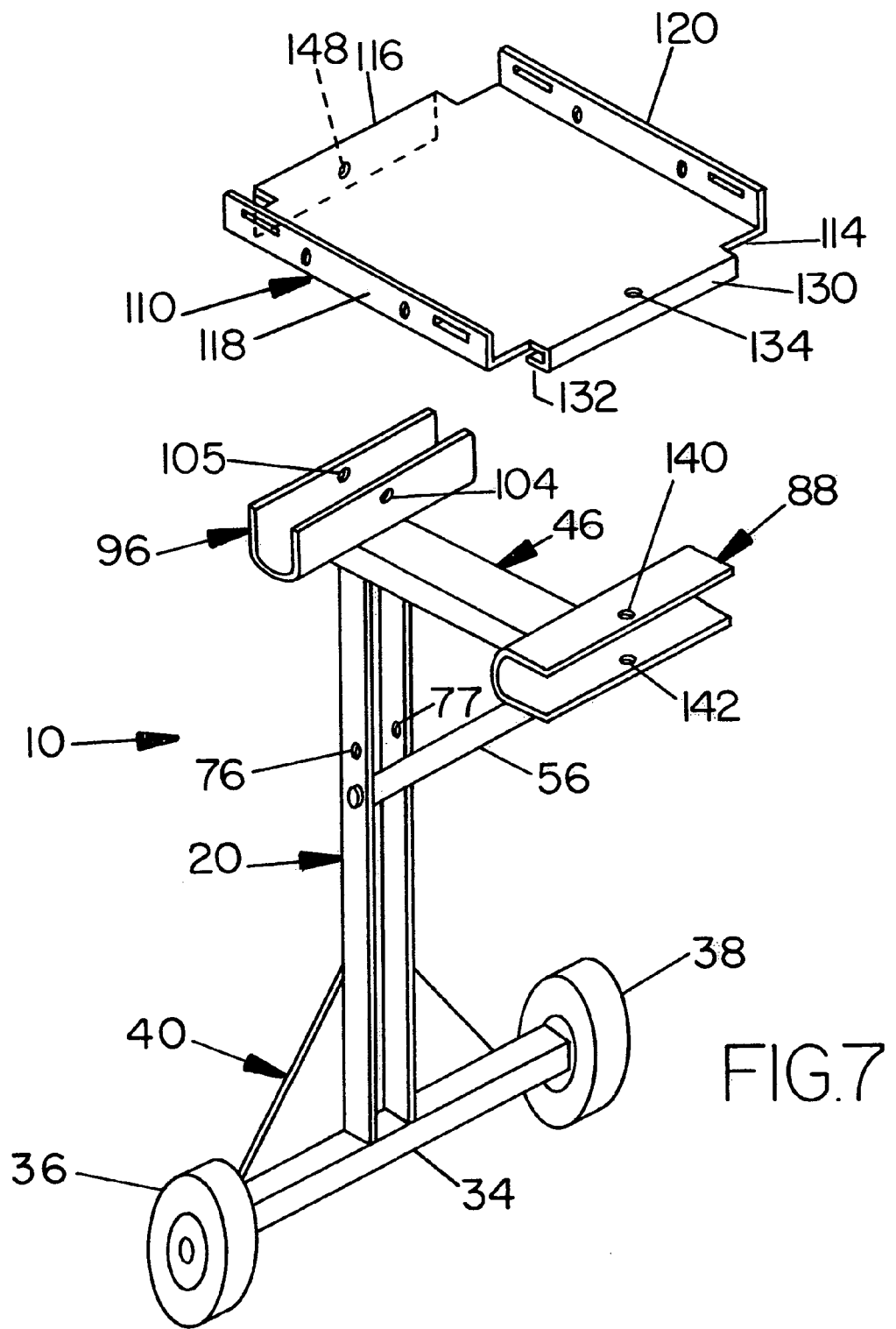
FIG. 7 is an exploded view of the device and attachment shown in FIG. 5 with the hidden parts of the attachment shown in broken lines.
Figure 8:
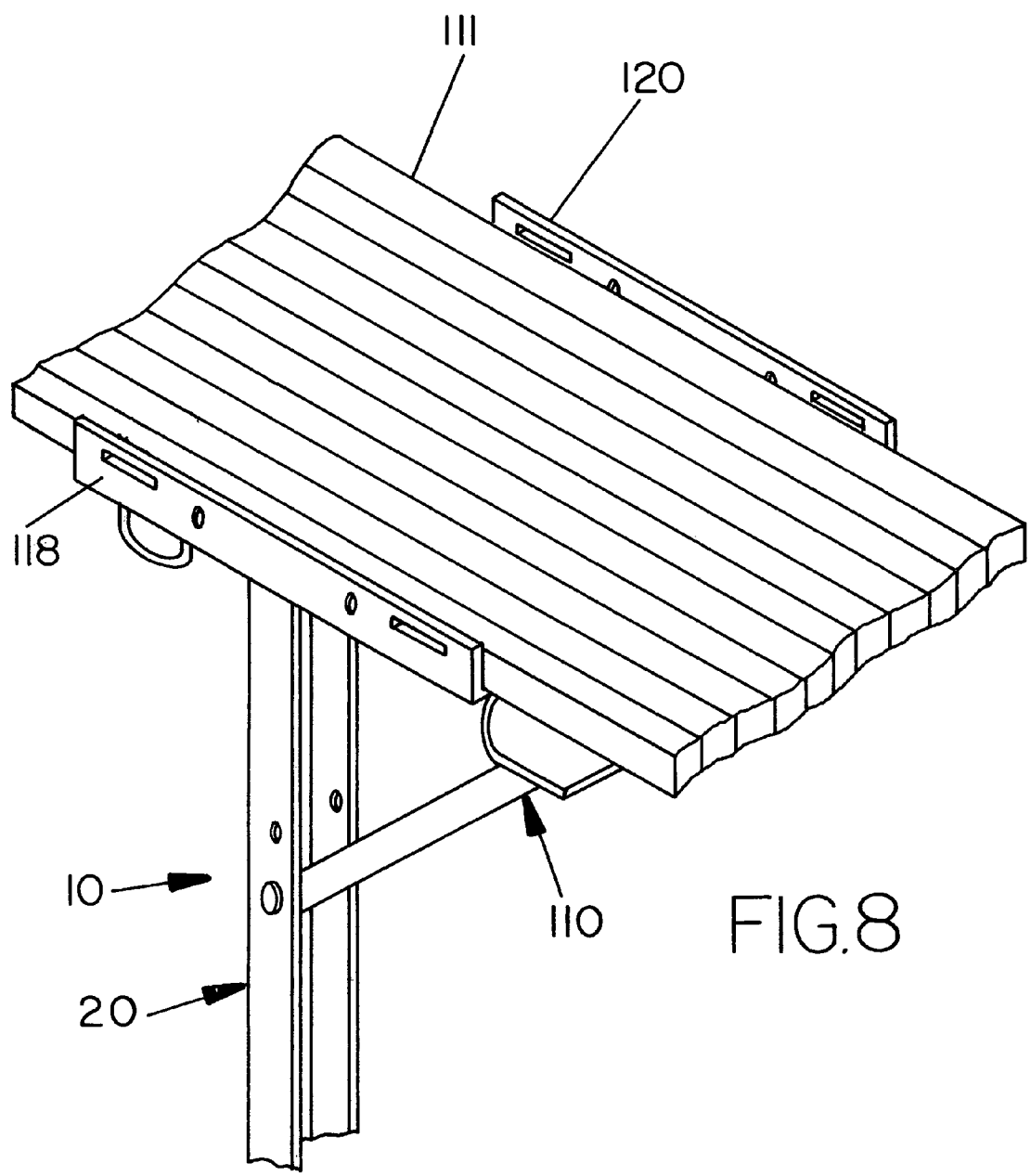
FIG. 8 is an isometric view of the device and attachment shown in FIG. 5 used to carry lumber.

The upper surface of the central body 112 is covered with a material with a high coefficient of friction such as a rubber or an abrasive material 150 to provide resistance to longitudinal movement of long objects 111 retained of the surface of the tray 110. It should be appreciated that the device 10 and the tray 110 may be sold independently, or together as a kit as shown in FIG. 7.

Figure 13:
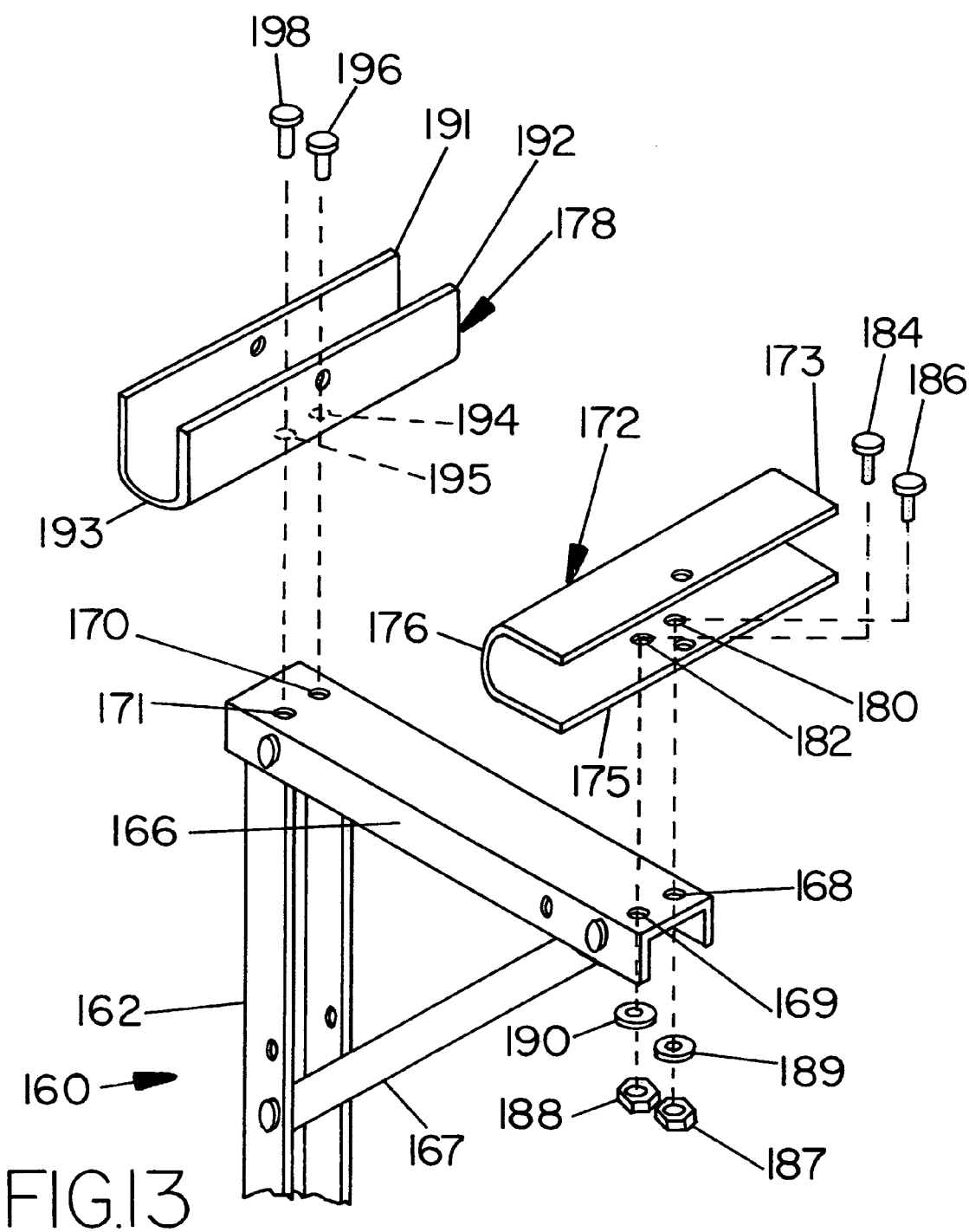
FIG. 13 is a fragmentary exploded isometric view of another embodiment of the invention usable for carrying a ladder with hidden portions of the device shown in broken lines.
Figure 14:
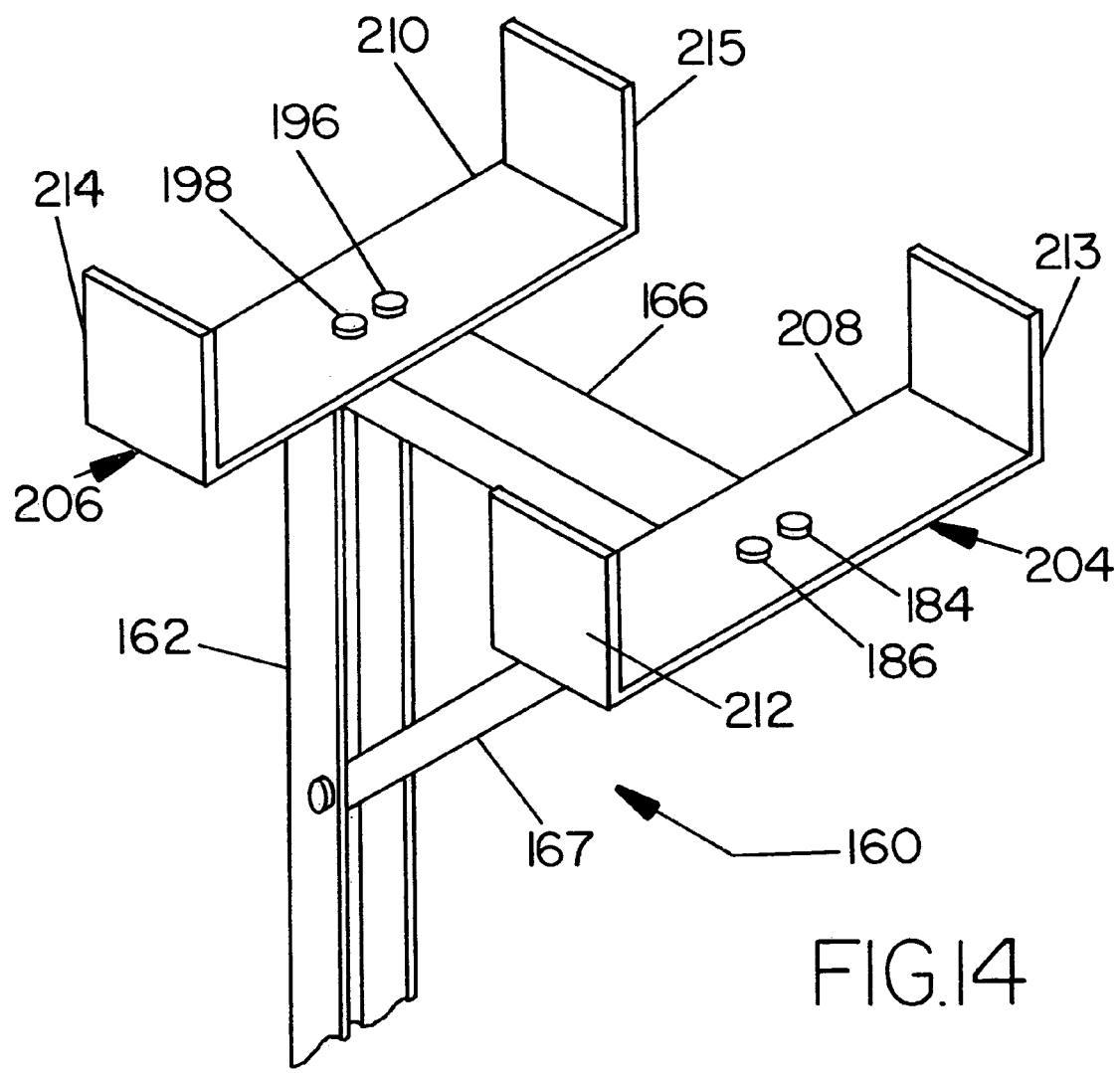
FIG. 14 is a fragmentary isometric view of the device shown in FIG. 13 modified to carry long objects other than a ladder.
Figure 15:
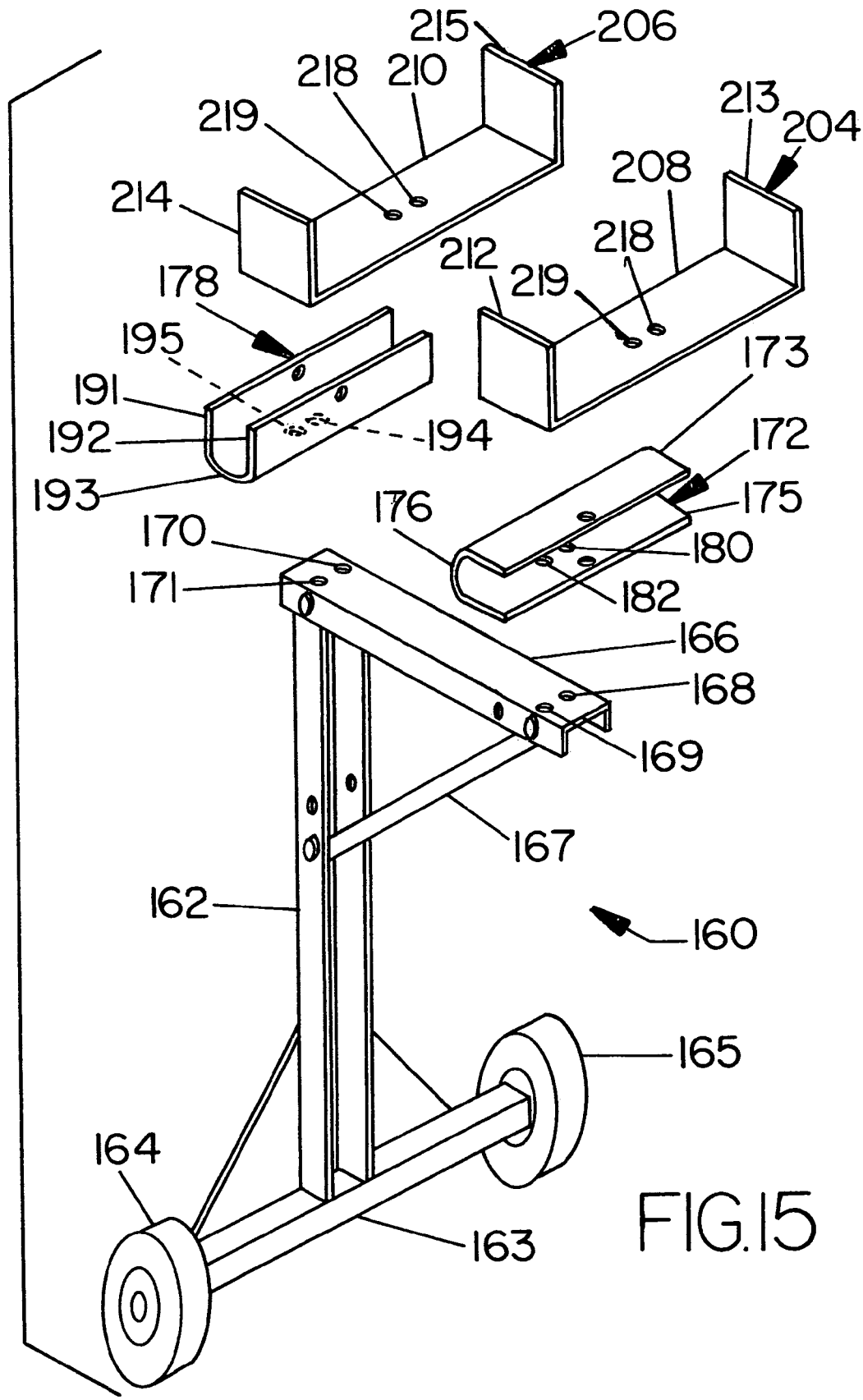
FIG. 15 is and exploded view showing all the parts of the embodiment shown in FIGS. 13 and 14; and, FIG. 16 is a greatly enlarged fragmentary isometric view of the device shown in FIG. 1 through 8 showing the hitch pin and retaining clip to retain the second hook around the rung of a ladder.

Referring to FIGS. 13, 14 and 15, a second embodiment 160 of the device includes a generally vertical frame 162 similar to the frame member 20 previously described, a cross bar 163, shown only in FIG. 15, at the lower end of the frame 162 similar to the cross bar 34, and at the outer ends of the cross bar are a pair of wheels 164, 165. Pivotally mounted to the upper end of the frame 162 is an arm 166 constructed similar to the channel arm 46 and a support arm 167 similar to support arm 56.

Instead of having two channel hooks welded directly to the back of the arm 166, the arm 166 is provided with two pairs of spaced apart holes 168, 169, and 170, 171, one pair 168, 169 through one end of the back of the arm 166, and a second pair 170, 171 through the second end. A channel hook 172 with parallel sides 173, 175 and an arcuate back 176 has a pair of spaced apart holes 180, 182 located midway along the length of one side member 175 with the holes positioned and spaced to align with the holes 168, 169 at the outer end of the arm 166. The channel hook 172 is then retained to the arm 164 by a pair of threaded bolts 184, 186 extending through the aligned holes 168, 169 and 180, 182 and held in place by nuts 187, 188 and lock washers 189, 190. In similar fashion, a second channel hook 178 having parallel side panels 191, 192 and an arcuate back 193 has spaced apart holes 194, 195 in the arcuate back thereof adapted to receive a second pair of bolts 196, 198 that extend through the second pair of holes 170, 171 in the arm 166. Again, the parts are retained together by a pair of complementary nuts and lock washers, not visible, threaded on the ends of the bolts 196, 198. With the channel hooks bolted on as shown, the device 160 can be used to transport a ladder in the manner described with respect to the device 10.

The device 160 can be modified to carry other long objects by unbolting the channel hooks 172, 178 and replacing them with a pair of retaining brackets 204, 206. Each of the retaining brackets 204, 206 has an elongate body 208, 210 respectively, with the ends 212, 213 and 214, 215 of the bracket bodies 208, 210 respectively, bent at ninety degrees to the body such that the ends 212-215 will aid in retaining long objects on the device 160. Each of the brackets 204, 206 has a pair of holes 216, 217 and 218, 219 centrally located in the body 208, 210 thereof spaced and positioned to align with the holes 168-171 in the arm 166 while the brackets 204, 206 are oriented perpendicular to the length of the arm 164. The bolts 184, 186, 196, 198 used to retain the channel hooks 172, 174 may therefore alternately be used to retain the brackets 204, 206 to the arm 166. As with the tray 119, the central portions of the brackets 204, 206 should be covered with a material having a high coefficient of friction to reduce sliding of long objects being carried by the brackets.

As shown in FIG. 15, the device 160 is preferably sold as a kit that includes the wheeled frame 162 and pivot arm 164, a pair of channel hooks 172, 178, and a pair of brackets 204, 206.

While the present invention has been described with respect to a number of embodiments, it will be appreciated that many modifications and variations may be made without departing from the true spirit and scope of the invention. It is therefore the intent of the appended claims to cover all such modifications and variations that fall within the true spirit and scope of the invention.

What is claimed is:

1. A device for transporting a ladder having a plurality of equally spaced parallel rungs, said device comprising
    a frame having an upper end, a lower end, and defining a longitudinal axis extending from said upper end to said lower end,
    a pair of wheels rotatably mounted to said lower end for rolling said frame over a surface,
    a first hook and a second hook mounted to said upper end,
    said first hook and said second hook each having a fixed open end,
    said first hook spaced from said second hook, and said open end of said first hook oriented to an angle of about ninety degrees with said open end of said second hook wherein said open end of said first hook will receive a first rung of said ladder after which said open end of said second hook will receive a second rung and while said second rung is retained in said second hook said first rung will be locked in said first hook to thereby retain said ladder to said device,
an arm extending from said upper end and generally perpendicular to said longitudinal axis,
said first hook and said second hook mounted on said arm,
said first hook having generally parallel side members and an end member joining a first end of each of said parallel side members and a second end of said parallel side members defining said first hook open end,
said second hook having generally parallel side members and an end member joining a first end of each of said parallel side members and a second end of said parallel side members defining said second hook open, end,
said side members of said first hook being generally parallel to said arm, and
said side members of said second hook being generally perpendicular to said arm.

2. The device of claim 1 wherein said first hook member is a channel having parallel planar side portions, a transverse end portion, and a length that is a little less than a length of said first rung.

3. The device of claim 1 and further comprising
a removable retainer for locking said second rung within said second hook while said removable retainer is in place and unlocking said second rung when said removable retainer is removed.

4. The device of claim 1 and further comprising
a pivot between said frame and said arm wherein said arm is moveable from a first position generally perpendicular to said longitudinal axis and a second position generally parallel to said longitudinal axis, and
a lock for locking said arm in said first position.

5. The device of claim 1 and further comprising
a plate,
an attachment for removably attaching said plate across an upper surface of said first hook and said second hook.

6. The device of claim 5 and further comprising a material on a surface of said plate having a high coefficient of friction to reduce the sliding of objects carried on said plate.

7. The device of claim 1 wherein said first hook and said second hook removably attached to said arm by bolts.

8. The device of claim 7 and further comprising
a retainer bracket having a planar central surface and perpendicularly extending outer end surfaces, and
said retainer bracket attachable to said arm in substitution for said first hook and said second hook.

9. The device of claim 7 and further comprising
a second retaining bracket,
said second retaining bracket having a planar central surface and perpendicularly extending outer end surfaces, and
said second retaining bracket attachable to said arm spaced from said bracket.

10. The device of claim 1 wherein
said first hook having generally parallel side members and an end member joining a first end of each of said parallel side members and a second end of said parallel side members defining said first hook open end, and
said second hook having generally parallel side members and an end member joining a first end of each of said parallel side members and a second end of said parallel side members defining said second hook open end.

11. A transporting device comprising
a frame having an upper end, a lower end, and defining a longitudinal axis extending from said upper end to said lower end,
a pair of wheels rotatably mounted to said lower end for rolling said frame over a surface,
an arm extending from said upper end,
said arm having a first end and a second end,
a pivot connecting said first end to said arm to said upper end wherein said arm is moveable about said pivot from a first position generally perpendicular to said longitudinal axis to a second position generally parallel to said longitudinal axis,
a lock for selectively locking and unlocking said arm into said first position, and
a retainer on said arm for retaining a long object wherein a operator can position said long object on said retainer and by controlling one end of said long object and transport said long object across a surface using said device while said arm is locked in said first position and can store said device while said arm is in said second position,
an elongate first hook and an elongate second hook,
a first attachment for removably attaching said first hook to said arm,
a second attachment for removably attaching said second hook to said arm, and
said second hook spaced from said first hook wherein said first hook will receive a first rung of a ladder and said second hook will receive a second rung of said ladder for transporting said ladder on said device.

12. The device of claim 11 and further comprising
a retaining bracket,
said retaining bracket having a planar central surface and perpendicularly extending outer end surfaces, and
said retaining bracket removably attachable to said retainer.

13. The device of claim 12 and further comprising
a second bracket having a central body and perpendicularly extending outer end surfaces, and
said second bracket removably attachable to said retainer at a location spaced from said bracket.

14. The device of claim 11 wherein said first hook is a channel hook having parallel planar side portions, a transverse end portion, and a length that is a little less than a length of said first rung.

15. The device of claim 14 wherein
said first hook has an open end and said second hook has an open end,
said first hook attachable to said arm with said open end in a first orientation, and
said second hook attachable to said arm with said open end in a second orientation about 90 degrees from said first orientation wherein said first and second hooks can receive rungs of a ladder and said rung received in said first hook cannot be removed therefrom while said second rung is retained in said second hook.

* * * * *